United States Patent
Lu et al.

(10) Patent No.: US 10,807,072 B2
(45) Date of Patent: Oct. 20, 2020

(54) PREPARATION METHOD OF A VISIBLE-LIGHT-DRIVEN CC@SNS₂/SNO₂ COMPOSITE CATALYST, AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 152 days.

(21) Appl. No.: 16/172,742

(22) Filed: Oct. 27, 2018

(65) Prior Publication Data

US 2019/0126243 A1    May 2, 2019

(30) Foreign Application Priority Data

Oct. 27, 2017 (CN) .......................... 2017 1 1024769

(51) Int. Cl.
*B01J 23/14* (2006.01)
*B01J 27/04* (2006.01)
(Continued)

(52) U.S. Cl.
CPC ............... *B01J 23/14* (2013.01); *B01J 6/001* (2013.01); *B01J 21/18* (2013.01); *B01J 27/04* (2013.01);
(Continued)

(58) Field of Classification Search
None
See application file for complete search history.

(56) References Cited

U.S. PATENT DOCUMENTS

| | | | | |
|---|---|---|---|---|
| 4,914,071 A | * | 4/1990 | Collins | ..................... B01J 37/16 502/185 |
| 2009/0093886 A1 | * | 4/2009 | O'Connor | .............. D03D 15/00 623/18.11 |

OTHER PUBLICATIONS

Zhang et al, Hydrothermal synthesis of SnO2/SnS2 nanocomposite with high visible light-driven photocatalytic activity, materials letters, 65, 19-20, pp. 2891-2894 (Year: 2011).*

(Continued)

*Primary Examiner* — Stefanie J Cohen
(74) *Attorney, Agent, or Firm* — SZDC Law P.C.

(57) ABSTRACT

The present invention disclosed preparation method of a visible-light-driven CC@SnS₂/SnO₂ composite catalyst, and application thereof, comprising the following steps: preparing CC@SnS₂ composite material in a solvent by using SnCl₄·5H₂O and C₂H₅NS as raw materials and carbon fiber cloth as a supporting material; calcining said CC@SnS₂ composite material to obtain the visible-light-driven CC@SnS₂/SnO₂ composite catalyst. The present invention overcomes defects of the traditional methods of treating chromium-containing wastewater, including chemical precipitation, adsorption, ion exchange resin and electrolysis, and the photocatalytic technology can make full use of solar light source or artificial light source without adding adsorbent or reducing agent. In this case, the use of semiconductor photocatalyst to convert hexavalent chromium in chromium wastewater into less toxic and easily precipitated trivalent chromium greatly reduces the cost and energy consumption.

3 Claims, 3 Drawing Sheets

(51) Int. Cl.
*B01J 35/00* (2006.01)
*B01J 37/08* (2006.01)
*B01J 21/18* (2006.01)
*B01J 6/00* (2006.01)
*B01J 37/12* (2006.01)
*C02F 101/22* (2006.01)
*C02F 1/68* (2006.01)

(52) U.S. Cl.
CPC ........... *B01J 35/002* (2013.01); *B01J 35/004* (2013.01); *B01J 37/08* (2013.01); *B01J 37/12* (2013.01); *B01J 21/185* (2013.01); *C02F 1/68* (2013.01); *C02F 2101/22* (2013.01)

(56) References Cited

OTHER PUBLICATIONS

Zhou et al, controlled strategy to synthesize SnO2 decorated SnS2 nanosheets with enhanced visible light photocatalytic activity, crystlengcomm, 14, pp. 5627-5633 (Year: 2012).*

Zhang et al, One-step hydrothermal synthesis of high-performancevisible-light-driven SnS2/SnO2nanoheterojunction photocatalyst forthe reduction of aqueous Cr(VI), applied catalysis B: environmental, 144, pp. 730-738 (Year: 2014).*

Xu et al, Interface Bonds Determined Gas-Sensing of SnO2—SnS2 Hybrids to Ammonia at Room Temperature, ACS Appl. Mater. Interfaces, pp. 11359-11368 (Year: 2015).*

Xu et al, SnS2@Graphene nanosheet arrays grown on carbon cloth as freestanding binder-free flexible anodes for advanced sodium batteries, journal of alloys and compounds, 654, pp. 357-362, Sep. 2015 (Year: 2015).*

* cited by examiner

PREPARATION METHOD OF A VISIBLE-LIGHT-DRIVEN CC@SNS$_2$/SNO$_2$ COMPOSITE CATALYST, AND APPLICATION THEREOF

This application claims priority to Chinese Patent Application No.: 201711024769.7, filed on Oct. 27, 2017, which is incorporated by reference for all purposes as if fully set forth herein.

FIELD OF THE INVENTION

The present invention belongs to the field of inorganic functional materials, especially relates to a preparation method of a visible light response CC@SnS$_2$/SnO$_2$ composite catalyst and its application to removal of hexavalent chromium in water.

TECHNICAL BACKGROUND

China's water pollution is mainly chemical pollution-based, especially the most serious water pollution caused by heavy metals such as Cd, Cu, Cr and etc. Among them, chromium wastewater is the most common. According to the study, heavy metal chromium is highly carcinogenic to most organisms and its solubility in water is high. Moreover, heavy metal chromium in water ecosystem can cause diseases including diarrhea, liver cancer and skin cancer and seriously endanger the human health and life safety. Therefore, looking for cheap, efficient and energy-saving methods for degradation of chromium wastewater has become a hot issue in environmental research.

SUMMARY OF THE INVENTION

The object of the present invention is to provide an inorganic functional material which can respond to visible light and degrade hexavalent chromium in water.

In order to achieve the above object, the present invention adopts the follow technical solution:

A preparation method of a visible-light-driven CC@SnS$_2$/SnO$_2$ composite catalyst, comprising the following steps:

1) preparing CC@SnS$_2$ composite material in a solvent by using SnCl$_4$.5H$_2$O and C$_2$H$_5$NS as raw materials and carbon fiber cloth as a supporting material;

2) calcining said CC@SnS$_2$ composite material to obtain the visible-light-driven CC@SnS$_2$/SnO$_2$ composite catalyst.

The present invention also disclosed CC@SnS$_2$ composite material and its preparation method, comprising the following steps:

preparing CC@SnS$_2$ composite material in a solvent by using SnCl$_4$.5H$_2$O and C$_2$H$_5$NS as raw materials and carbon fiber cloth as a supporting material.

In the above technical solution, in step 1), the molar ratio of SnCl$_4$.5H$_2$O and C$_2$H$_5$NS is (1.5 to 2):(5 to 10), the reaction temperature is 150 to 200° C., the reaction time is 12 to 20 h; Preferably, the SnCl$_4$.5H$_2$O and C$_2$H$_5$NS are stirred and mixed with solvent for 10 to 30 min, and then carbon fiber cloth is added for further reaction; Preferably, cooling to room temperature after the reaction is completed, the product is washed with deionized water and ethanol respectively, and dried to obtain CC@SnS$_2$ composite material, preferably, the drying temperature is 30 to 60° C. In addition, the suitable reaction condition and the ratio of the raw materials in the step 1) can facilitate the formation of a smooth surface SnS$_2$ nanosheets and grow uniformly on the carbon cloth, providing a good specific surface for the reaction of step 2).

In the above technical solution, in step 2), the calcination temperature is 300 to 500° C. and the calcination time is 10 to 60 minutes. 15 to 30 minutes is preferred.

The technical solution of the present invention is further described by an example as follows:

(1) CC@SnS$_2$ is prepared by one-step solvothermal method: 1.5 to 2 mmol SnCl$_4$.5H$_2$O is added in a reaction kettle, adding 20 to 40 mL isopropanol as solvent, stirring till dissolved and adding 5 to 10 mmol C$_2$H$_5$NS, keeping stirring for a time and then a piece of carbon fiber cloth (1×1 to 3×3 cm$^2$) is put in the reaction kettle and standing against the wall, the reaction kettle is heated in an oven for a period of time. After cooling to room temperature, the product is collected and rinsed with deionized water and ethanol repeatedly and then dried;

(2) CC@SnS$_2$/SnO$_2$ is prepared by thermal oxidation method: the product obtained in step (1) is placed in a quartz boat and calcined in a tube furnace for a certain period of time to obtain the CC@SnS$_2$/SnO$_2$ composite material.

In the present invention, the SnS$_2$ catalyst is modified onto the surface of the carbon cloth by a one-step solvothermal method and the composite CC@SnS$_2$/SnO$_2$ is obtained through a simple thermal oxidation method, and CC@SnS$_2$/SnO$_2$ can be widely used in the degradation of hexavalent chromium in water. Therefore, the present invention further discloses the application of the visible-light-driven CC@SnS$_2$/SnO$_2$ composite photocatalyst in the degradation of hexavalent chromium in water, or the application of the visible-light-driven CC@SnS$_2$/SnO$_2$ composite photocatalyst in the preparation of a hexavalent chromium treatment agent. Meanwhile, the present invention also discloses the visible-light-driven CC@SnS$_2$ composite is in the preparation of CC@SnS$_2$/SnO$_2$ composite photocatalyst or in the preparation of hexavalent chromium treatment agent.

Compared with existing technologies, the present invention has the advantages as follows:

(1) The present invention adopted facile solvothermal method and thermal oxidation method to obtain a series of the CC@SnS$_2$/SnO$_2$ composite photocatalysts, which has the advantages of simple preparation process, abundant source of materials, low preparation cost, and easy realization of large-scale production. SmS$_2$ has the band gap of about 2.2 eV and is an efficient, stable visible light catalyst. However, the prior technologies show that the recombination rate of photogenerated electrons and holes in SnS$_2$ is relatively high, affecting the photocatalytic efficiency. The present invention uses a stable oxide semiconductor to composite SnS$_2$, which can increase the separation of photoionization electron and hole, accordingly increasing its photocatalytic activity. SnO$_2$ can form a heterostructure with SnS$_2$ according to their matched band potentials, which enhances the photocatalytic activity compared with single SnS$_2$ and SnO$_2$. Meanwhile, using carbon cloth as a catalyst carrier, is conducive to the recovery and recycling of composite photocatalyst.

(2) In the present invention, the CC@SnS$_2$/SnO$_2$ composite photocatalyst can promote the separation of photogenerated carriers in the SnS$_2$ and SnO$_2$, which can effectively increase the living lifetime of the photogenerated charge and promote the photocatalytic activity of the photocatalyst; Meanwhile, the CC@SnS$_2$/SnO$_2$ composite can inhibit the recombination of electrons and holes, which can be favor to improve the degradation efficiency of chromium in wastewater. Moreover, the present invention replaces the expensive metal elements in the metal semiconductor materials. More importantly, carbon cloth as a catalyst carrier, is conducive to the recovery and recycling of photocatalysts.

(3) The present invention overcomes the traditional methods of treating chromium-containing wastewater including chemical precipitation method, adsorption method, ion exchange resin method and electrolysis method. The photocatalytic technology can utilize solar light source or artificial light source without adding adsorbent or reducing agent. Meanwhile, using a semiconductor photocatalyst can convert wastewater hexavalent chromium into less toxic, easy to form a precipitate of trivalent chromium, significantly reduces the processing costs and energy consumption.

DETAILED DESCRIPTION OF THE INVENTION

The invention will be further described according to the following specific implementations.

Implementation 1

Synthesis of CC@$SnS_2$ 1.6 mmol $SnCl_4 \cdot 5H_2O$ is added in a reaction kettle including 30 mL isopropanol and stirred till dissolved. Adding 6 mmol $C_2H_5NS$ and stirring for 30 min. After that, a piece of carbon fiber cloth of 2×2 $cm^2$ is immersed in the kettle standing against the wall, and the kettle is heated at 180° C. for 24 h in an oven. After cooling to room temperature, the product is collected and rinsed with deionized water and ethanol repeatedly and finally dried in an oven at 60° C.

Figure 1:
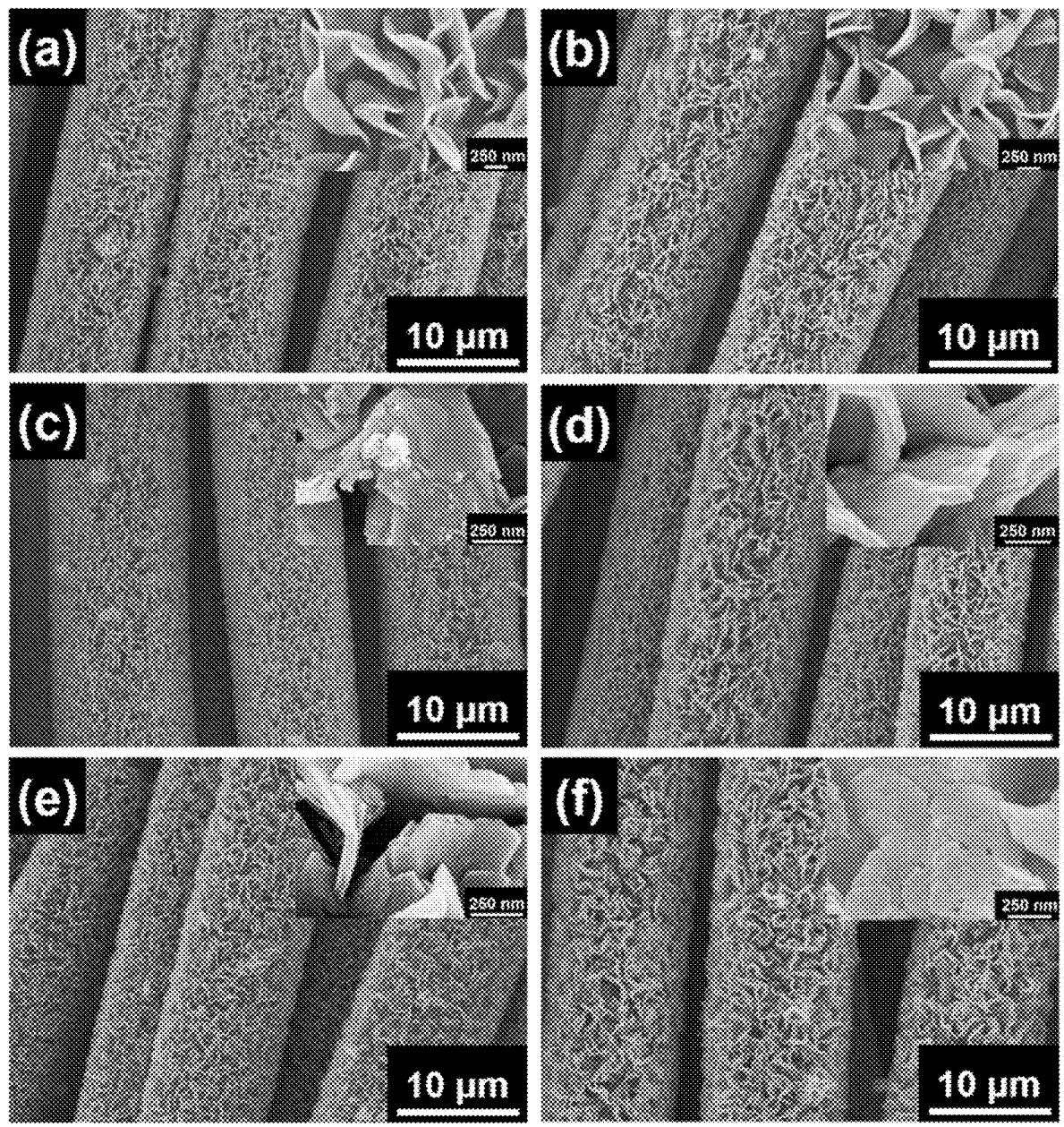
FIG. 1 shows SEM images of CC@$SnS_2$, CC@$SnS_2$/$SnO_2$ and CC@$SnO_2$ in implementation 1 to 6.

In order to observe the morphology of the composite material, the product prepared by this implementation is characterized by SEM. FIG. 1 is a SEM image of a visible light-responsive CC@$SnS_2$ catalyst prepared in this implementation. (a) is CC@$SnS_2$ catalyst prepared in this implementation.

Implementation 2

Synthesis of CC@$SnS_2$/$SnO_2$

The prepared product of implementation 1 is placed in a quartz boat and calcined at 400° C. for 15 min in a tube furnace to obtain a CC@$SnS_2$/$SnO_2$ composite.

In order to observe the morphology of the composite material, the product prepared by this implementation is characterized by SEM. FIG. 1 is a SEM image of a visible light-responsive CC@$SnS_2$/$SnO_2$ catalyst prepared in this implementation. (b) is CC@$SnS_2$/$SnO_2$ catalyst prepared in this implementation.

Implementation 3

Synthesis of CC@$SnS_2$/$SnO_2$

The prepared product of implementation 1 is placed in a quartz boat and calcined at 400° C. for 30 min in a tube furnace to obtain a CC@$SnS_2$/$SnO_2$ composite.

In order to observe the morphology of the composite material, the product prepared by this implementation is characterized by SEM. FIG. 1 is a SEM image of a visible light-responsive CC@$SnS_2$/$SnO_2$ catalyst prepared in this implementation. (c) is CC@$SnS_2$/$SnO_2$ catalyst prepared in this implementation.

Implementation 4

Synthesis of CC@$SnS_2$/$SnO_2$

The prepared product of implementation 1 is placed in a quartz boat and calcined at 400° C. for 45 min in a tube furnace to obtain a CC@$SnS_2$/$SnO_2$ composite.

In order to observe the morphology of the composite material, the product prepared by this implementation is characterized by SEM. FIG. 1 is a SEM image of a visible light-responsive CC@$SnS_2$/$SnO_2$ catalyst prepared in this implementation. (d) is CC@$SnS_2$/$SnO_2$ catalyst prepared in this implementation.

Implementation 5

Synthesis of CC@$SnS_2$/$SnO_2$

The prepared product of implementation 1 is placed in a quartz boat and calcined at 400° C. for 60 min in a tube furnace to obtain a CC@$SnS_2$/$SnO_2$ composite.

In order to observe the morphology of the composite material, the product prepared by this implementation is characterized by SEM. FIG. 1 is a SEM image of a visible light-responsive CC@$SnS_2$/$SnO_2$ catalyst prepared in this implementation. (e) is CC@$SnS_2$/$SnO_2$ catalyst prepared in this implementation.

Implementation 6

Synthesis of CC@$SnO_2$

The prepared product of implementation 1 is placed in a quartz boat and calcined at 400° C. for 90 min in a tube furnace to obtain a CC@$SnO_2$ composite.

In order to observe the morphology of the composite material, the product prepared by this implementation is characterized by SEM. FIG. 1 is a SEM image of a visible light-responsive CC@$SnO_2$ catalyst prepared in this implementation. (f) is CC@$SnS_2$/$SnO_2$ catalyst prepared in this implementation.

Based on the above, it can be seen from FIG. 1 (a) that the sheets of the CC@$SnS_2$ catalyst are composed of hexagonal $SnS_2$ sheets. When starting calcination, the $SnO_2$ particles appear on the CC@$SnS_2$ catalyst to form CC@$SnS_2$/$SnO_2$ composite catalyst. It is found from FIG. 1 (b) to (e) that with the oxidation time increases, the amount of the $SnO_2$ particles increases and start to aggregate. Therefore, when the calcination time reaches 90 min, the $SnO_2$ nanosheets composed of $SnO_2$ nanoparticles are formed. Moreover, the retention of the nanosheet structure during calcination can be attributed to the stable support of CC and the slow oxidation rate at lower temperatures.

Figure 2:
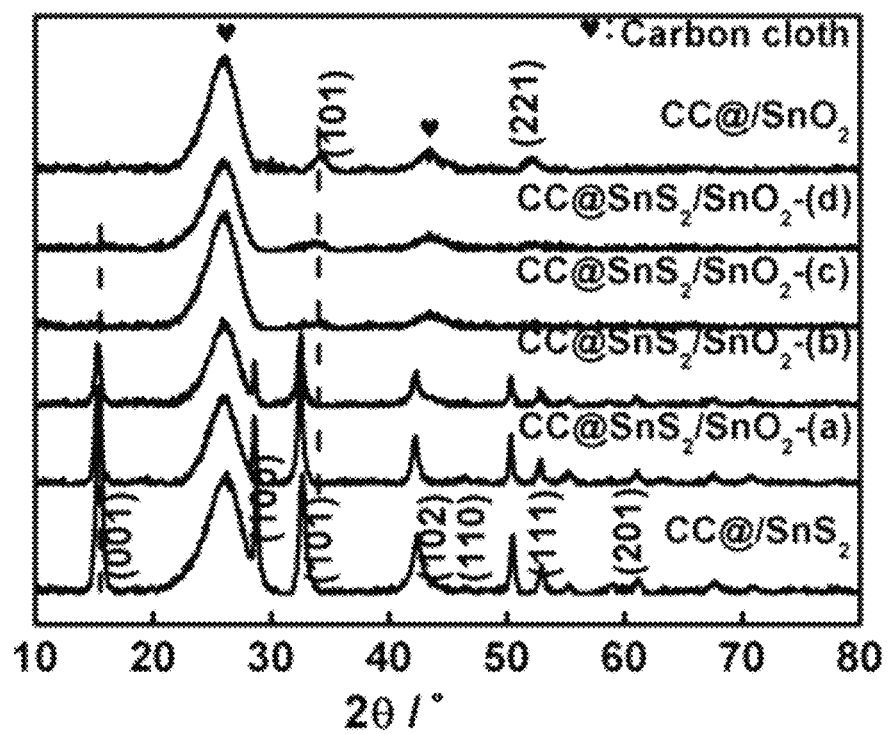
FIG. 2 shows XRD of CC@$SnS_2$, CC@$SnS_2$/$SnO_2$ and CC@$SnO_2$ in implementation 1 to 6.

FIG. 2 shows the XRD pattern of CC@SnS$_2$, CC@SnS$_2$/SnO$_2$ and CC@SnO$_2$, where (a) to (d) represent the products of implementation 2 to 5, respectively. It is clear that the increasing calcination time led to an increase in the peak intensity of the SnO$_2$ phase at the expense of decreasing the peak intensity of SnS$_2$, demonstrating that SnS$_2$ on carbon cloth gradually becomes SnO$_2$. Meanwhile, it is worth noting that no unassigned diffraction peaks are present for any sample, which illustrates the high purity of the catalysts.

Implementation 7

Figure 3:
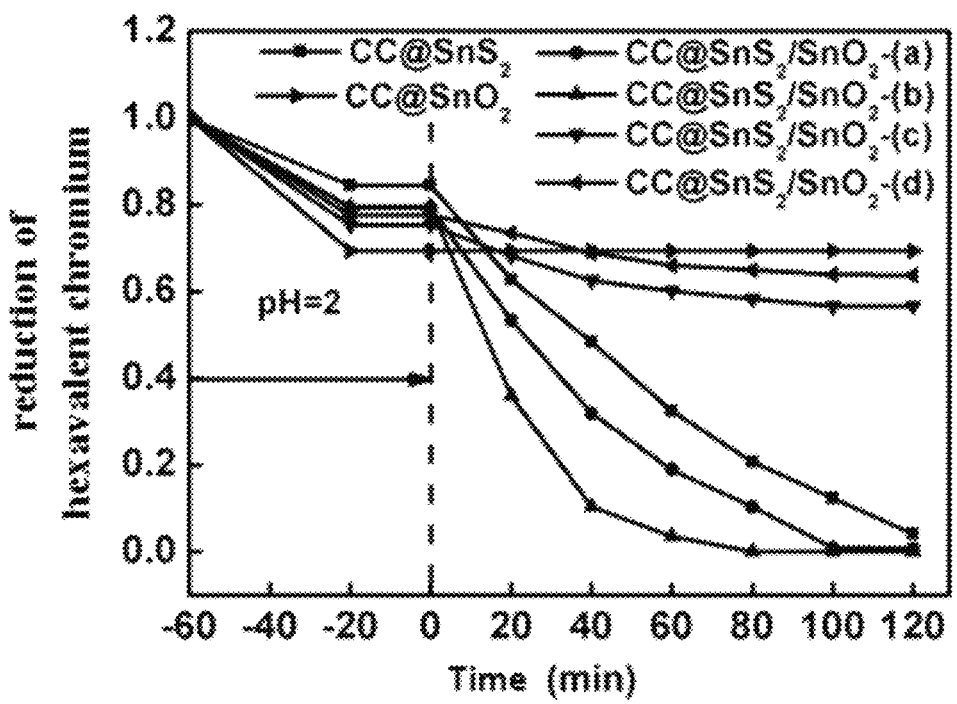
FIG. 3 shows the degradation of hexavalent chromium in water with CC@$SnS_2$, CC@$SnS_2$/$SnO_2$ and CC@$SnO_2$ in implementation 1 to 6.

Photocatalytic Reduction of Hexavalent Chromium (Cr(VI)) by CC@SnS$_2$, CC@SnS$_2$/SnO$_2$ and CC@SnO$_2$ 120 mg photocatalysts obtained in implementation 1 to 6 is added into 50 mL of Cr(VI) solution at a concentration of 10 mg/L. The samples are treated in the dark for 60 min at room temperature to achieve adsorption-desorption equilibrium. After that, the system is illuminated under a 300 W xenon lamp. At each 20 min interval, 3 mL of solution is extracted and analyzed by recording the variations in the absorption band maximum (540 nm) of Cr(VI) using a UV-Vis spectrometer. FIG. 3 shows the photocatalytic reduction of Cr(VI) solution (10 mg/L) in the presence of 120 mg of CC@SnS$_2$, CC@SnS$_2$/SnO$_2$-(a-d), and CC@SnO$_2$, under visible light irradiation. It can be seen that the photocatalytic activities of CC@SnS$_2$/SnO$_2$-(a) and CC@SnS$_2$/SnO$_2$-(b) are higher than that of CC@SnS$_2$. However, CC@SnS$_2$/SnO$_2$-(c) and CC@SnS$_2$/SnO$_2$-(d) exhibited lower photocatalytic activity. The CC@SnS$_2$/SnO$_2$-(b) displayed the highest photocatalytic activity. When irradiated for 60 min with CC@SnS$_2$/SnO$_2$-(b), Cr(VI) in aqueous solution almost completely reduced. In this experiment, the reduction of Cr(VI) in water by CC@SnS$_2$/SnO$_2$-(b) is greatly improved because of inhibiting the recombination of electrons and holes.

Implementation 8

Cycling Photocatalytic Reduction of Hexavalent Chromium (Cr(VI)) by CC@SnS$_2$/SnO$_2$ The composite material CC@SnS$_2$/SnO$_2$-(b) recollected after 60 minutes of illumination in implementation 7 is washed with water and ethanol, dried and placed in 50 mL hexavalent chromium solution (10 mg/L). The xenon lamp is used to simulate sunlight for 60 min, and 3 mL is extracted as sample every 20 minutes. The absorbance at 540 nm of the water sample is measured using an UV-vis spectrophotometer. According to the above steps, repeat 3 times, test and record the data.

Figure 4:
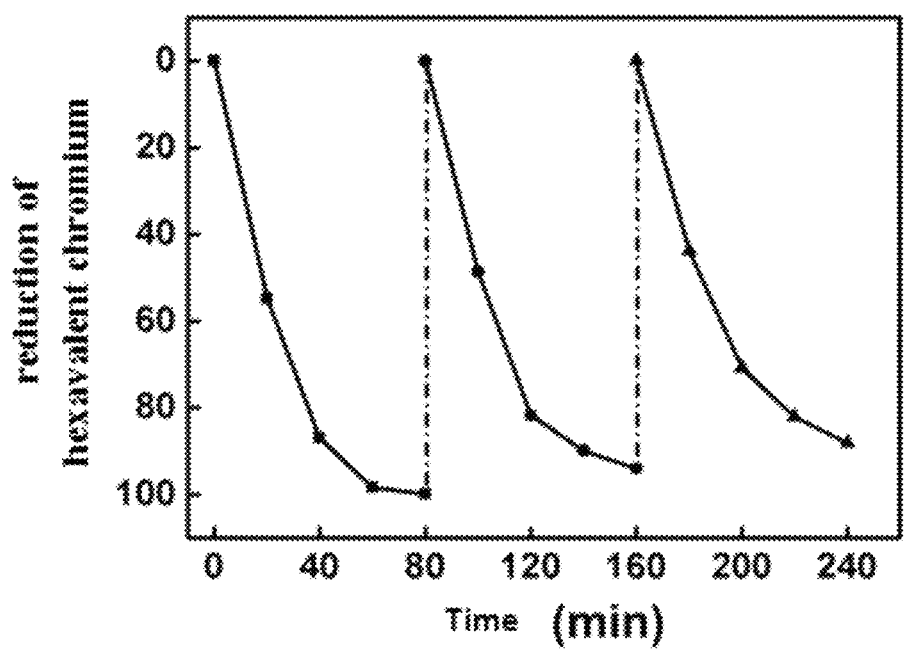
FIG. 4 shows cyclic performance of CC@$SnS_2$/$SnO_2$-2 for the reduction of hexavalent chromium in implementation 8.

It can be seen from FIG. 4 that the composites maintain excellent photocatalytic performance after three cycles and the final removal efficiency of hexavalent chromium in solution is more than 90%. Therefore, the catalyst can be reused with good stability.

What is claimed is:

1. A preparation method of a visible-light-driven CC@SnS$_2$/SnO$_2$ composite catalyst, consisting of the two following steps in a sequential order without any additional steps:
   1) preparing CC@SnS$_2$ composite material in isopropanol by using SnCl$_4$.5H$_2$O and C$_2$H$_5$NS as raw materials and carbon fiber cloth as a supporting material;
   2) calcining said CC@SnS$_2$ composite material to obtain the visible-light-driven CC@SnS$_2$/SnO$_2$ composite catalyst,
   wherein in step 2), a calcination temperature is 400° C. and a calcination time is 15 minutes.

2. The preparation method of a visible-light-driven CC@SnS$_2$/SnO$_2$ composite catalyst according to claim 1, wherein in step 1), the molar ratio of SnCl$_4$.5H$_2$O and C$_2$H$_5$NS is (1.5 to 2):(5 to 10), a reaction temperature is 150 to 200° C., a reaction time is 12 to 20 h.

3. The preparation method of a visible-light-driven CC@SnS$_2$/SnO$_2$ composite catalyst according to claim 1, wherein in step 1), the SnCl$_4$.5H$_2$O and C$_2$H$_5$NS are stirred and mixed with isopropanol for 10 to 30 min, and then carbon fiber cloth is added for further reaction; cooling to room temperature after a reaction of the SnCl$_4$.5H$_2$O and C$_2$H$_5$NS is completed, a product of the reaction of the SnCl$_4$.5H$_2$O and C$_2$H$_5$NS is washed with deionized water and ethanol respectively, and dried to obtain CC@SnS$_2$ composite material.

* * * * *